(12) United States Patent
McGeehan et al.

(10) Patent No.: US 11,280,259 B2
(45) Date of Patent: Mar. 22, 2022

(54) TURBINE

(71) Applicant: Cummins Ltd., London (GB)

(72) Inventors: Oscar McGeehan, Nottingham (GB);
John Bywater, Huddersfield (GB);
Richard Goodyear, Sheffield (GB);
Mark R. Holden, Wakefield (GB);
George E. Sandford, Huddersfield (GB)

(73) Assignee: CUMMINS LTD, London (GB)

(*) Notice: Subject to any disclaimer, the term of this patent is extended or adjusted under 35 U.S.C. 154(b) by 0 days.

(21) Appl. No.: 16/756,959

(22) PCT Filed: Oct. 17, 2018

(86) PCT No.: PCT/GB2018/052995
§ 371 (c)(1),
(2) Date: Apr. 17, 2020

(87) PCT Pub. No.: WO2019/077350
PCT Pub. Date: Apr. 25, 2019

(65) Prior Publication Data
US 2020/0370473 A1 Nov. 26, 2020

(30) Foreign Application Priority Data
Oct. 18, 2017 (GB) ..................... 1717127

(51) Int. Cl.
*F02B 37/18* (2006.01)
*F01D 9/02* (2006.01)
(Continued)

(52) U.S. Cl.
CPC ............. *F02B 37/186* (2013.01); *F01D 9/02* (2013.01); *F01D 17/105* (2013.01); *F02B 37/02* (2013.01); *F02B 37/22* (2013.01)

(58) Field of Classification Search
CPC ........ F02B 37/02; F02B 37/025; F02B 37/18; F02B 37/183; F02B 37/186; F02B 37/22;
(Continued)

(56) References Cited

U.S. PATENT DOCUMENTS 5,579,643 A * 12/1996 McEwen ................. F02B 37/18
60/602
6,202,413 B1 3/2001 Baker et al.
(Continued)

FOREIGN PATENT DOCUMENTS

CN 102536434 A 7/2012
CN 102787906 A 11/2012
(Continued)

OTHER PUBLICATIONS

International Search Report and Written Opinion issued by the European Patent Office, dated Jan. 10, 2019, for International Application No. PCT/GB2018/052995; 10 pages.
(Continued)

*Primary Examiner* — Jesse S Bogue
*Assistant Examiner* — Loren C Edwards
(74) *Attorney, Agent, or Firm* — Faegre, Drinker, Biddle & Reath, LLP (57) ABSTRACT

There is provided a turbine comprising: a turbine housing; a turbine wheel; an inlet upstream of the turbine wheel, the inlet defining a first inlet portion and a second inlet portion; an outlet downstream of the turbine wheel, the outlet defining a first outlet portion and a second outlet portion; and a wastegate arrangement configured to selectively vent exhaust gas from the first inlet portion to the first outlet portion via a first bypass passage, and further configured to selectively vent exhaust gas from the second inlet portion to the second outlet portion via a second bypass passage;
(Continued)

wherein the first outlet portion and the second outlet portion are separated by a baffle of the turbine housing.

16 Claims, 3 Drawing Sheets

(51) Int. Cl.
  *F01D 17/10* (2006.01)
  *F02B 37/02* (2006.01)
  *F02B 37/22* (2006.01)
(58) Field of Classification Search
  CPC . F02B 37/225; F01D 9/02; F01D 9/06; F01D 17/105; F05D 2220/40
  See application file for complete search history.

(56) References Cited

U.S. PATENT DOCUMENTS

| | | | |
|---|---|---|---|
| 8,516,814 B2* | 8/2013 | Okada | F02D 41/0007 60/602 |
| 2012/0148386 A1* | 6/2012 | Lombard | F16K 3/085 415/145 |
| 2012/0227400 A1 | 9/2012 | Erdmenger et al. | |
| 2012/0291431 A1* | 11/2012 | Bucknell | F01N 3/0835 60/602 |
| 2015/0052890 A1* | 2/2015 | Shinoda | F02D 41/0082 60/603 |
| 2020/0370473 A1 | 11/2020 | Bywater et al. | |

FOREIGN PATENT DOCUMENTS

| | | |
|---|---|---|
| CN | 106460533 A | 2/2017 |
| DE | 102014210507 A1 | 12/2015 |
| DE | 102015109144 A1 | 12/2015 |
| DE | 102014015882 A1 | 4/2016 |
| EP | 2463483 A2 | 6/2012 |
| EP | 3001011 A1 | 3/2016 |
| GB | 2038940 A | 7/1980 |
| WO | 992830 A1 | 1/1999 |

OTHER PUBLICATIONS

Search Report issued by the United Kingdom Intellectual Property Office, dated Apr. 11, 2018, for British Application No. GB1717127.3; 4 pages.

* cited by examiner

Figure 1

(PRIOR ART)

TURBINE

CROSS-REFERENCE TO RELATED APPLICATIONS

The present application is a national phase filing under 35 U.S.C. § 371 of International Application No. PCT/GB2018/052995, titled "TURBINE," filed on Oct. 17, 2018, which claims priority to British Patent Application No. 1717127.3, filed on Oct. 18, 2017, the entire disclosures of which being expressly incorporated herein by reference.

FIELD OF THE DISCLOSURE

The present disclosure relates to a turbine, and in particular to a turbine having a baffle separating a first outlet portion and a second outlet portion of the turbine.

BACKGROUND

Turbines are used to harness power from a working fluid by converting fluid pressure into rotational motion using a turbine wheel. This rotary motion can be used to do useful work, such as for example by generating electrical power or by powering a compressor within a turbocharger of which the turbine forms part.

Turbochargers are used to increase the pressure of air entering into an internal combustion engine using a turbine wheel and a compressor wheel mounted to a common shaft. Exhaust gasses from the internal combustion engine are passed through the turbine wheel, which causes rotation of the turbine wheel, shaft and compressor wheel. Air is drawn through the compressor wheel and compressed to a boost pressure which is above atmospheric pressure. By providing higher pressure air to the internal combustion engine, more oxygen is available within the internal combustion engine for the combustion of fuel. As such, the turbocharger permits more fuel to be combusted, and hence the internal combustion engine may produce more power.

Turbines, as part of a turbocharger or otherwise, are typically provided with either an axial or radial turbine arrangement. In axial turbine arrangements, a working fluid (such as exhaust gas) passes through the turbine wheel in a direction parallel to the axis of rotation of the turbine wheel. In radial turbine arrangements, the working fluid circulates around the turbine wheel in an inwardly directed spiral, before being deflected by the turbine wheel along a path parallel to the axis of rotation of the turbine wheel.

Radially arranged turbines typically comprise an inlet in the shape of a hollow spiral, referred to as a volute, which is shaped to encourage circulation of the working fluid around the turbine wheel. Some radial turbines are provided with a twin entry arrangement comprising two such volutes arranged to be either side-by-side or radially overlapping. Where such a twin volute turbine is used within a turbocharger, each volute is typically connected to a separate bank of cylinders of an internal combustion engine. Exhaust gasses from each bank of cylinders are fed to one of the inlet volutes by separate exhaust manifolds. The exhaust manifolds may be tuned using pressure wave superposition to provide more efficient flow of exhaust gasses through the exhaust manifolds and inlet volutes. In order to prevent interference between the tuned exhaust gasses in each manifold, the two streams of exhaust gasses are kept separate until they reach the turbine wheel, at which point both streams of exhaust gasses are directed through the turbine wheel.

Some turbines, particularly those used in turbochargers, comprise wastegates which are used to bypass exhaust gasses to a position downstream of the turbine wheel such that the exhaust gasses do not pass through the turbine wheel. Such wastegates are used to reduce the amount of exhaust gas impinging on the turbine wheel so as to regulate the power produced by the turbine wheel. In this manner, detrimental flow conditions in the turbocharger compressor, such as compressor surge, can be avoided.

It is known to provide a twin volute radial turbine with a wastegate, such as of the type disclosed in U.S. Pat. No. 5,046,317. In the case of U.S. Pat. No. 5,046,317, the wastegate is positioned in the outlet of the turbine and comprises a pair of valve members which are configured to selectively cover and uncover a pair of wastegate passages connected to either inlet volute. Depending upon the configuration of the internal combustion engine and the exhaust manifolds, it is common that only one of the exhaust manifolds is pressurised at any one time (i.e. because a cylinder which feeds that manifold has just fired). As such, when the wastegate is opened, pressure pulses from each wastegate passage are able to interfere with the pressure pulses from the other wastegate passage. Any pressure difference between the two passages can result in an impedance to gas flow through the less pressurised passage as the pressure of the pressurised passage is transmitted into region downstream the unpressurised passage. The increased local pressure downstream of the unpressurised passage reduces the velocity of the exhaust gasses travelling through the unpressurised passage, and thus the amount of exhaust gas which can be transmitted through the wastegate overall (i.e. the wastegate efficiency). It is therefore desirable to reduce such interference between the wastegate passages.

SUMMARY

It is an object of the present disclosure to obviate or mitigate at the problems prevalent in the prior art, whether identified herein or elsewhere.

According to a first aspect of the disclosure there is provided a turbine comprising: a turbine housing; a turbine wheel; an inlet upstream of the turbine wheel, the inlet defining a first inlet portion and a second inlet portion; an outlet downstream of the turbine wheel, the outlet defining a first outlet portion and a second outlet portion; and a wastegate arrangement configured to selectively vent exhaust gas from the first inlet portion to the first outlet portion via a first bypass passage, and further configured to selectively vent exhaust gas from the second inlet portion to the second outlet portion via a second bypass passage; wherein the first outlet portion and the second outlet portion are separated by a baffle of the turbine housing.

Because the baffle separates the first outlet portion and the second outlet portion, when the wastegate arrangement is opened, pressure pulses from the first outlet portion must travel around the baffle in order to interfere with the pressure pulses from the second outlet portion. Interference between the pressure pulses in either outlet portion therefore occurs at a distal end of the baffle and not at the points where the first and second bypass passages connect to the first and second outlet portions. It will be appreciated that the distal end of the baffle is defined as the most downstream point of the baffle relative to the flow of fluid through the outlet. As such, this structure prevents pulse wave interference occurring within (or immediately downstream of) the first and second bypass passages themselves, and therefore the corresponding impedance to flow through the first and second bypass passages is reduced. That is to say, by creating a more tortuous path for exhaust gas flow between the first and second bypass passages, the location of any interference between the pressures of the exhaust gasses in the first and second bypass passages is displaced away from the first and second bypass passages themselves. As such, the efficiency of the flow through the first and second bypass passages is increased.

It will be appreciated that the first and second inlet portions are separate portions of the turbine which are positioned upstream of the turbine wheel. The first and second inlet portions may be fully or partially defined by the turbine housing and may include some or all of an exhaust manifold connected to an internal combustion engine.

It will be appreciated that the first and second outlet portions are separate portions of the turbine which are positioned downstream of the turbine wheel. The first and second outlet portions are regions of the turbine outlet which are separated from one another by the baffle. The turbine outlet may comprise additional regions which do not form part of the either the first or second outlet portions. For example, the first and second outlet portions may feed into a common region of the turbine outlet downstream of the first and second outlet portions.

By the term "configured to selectively vent" it will be understood that the wastegate arrangement is configurable between a first state in which gas flow communication between the first and second inlet portions and the first and second outlet portions via the first and second bypass passages is substantially prevented, and a second state in which such gas flow communication is permitted. As such, the wastegate arrangement may comprise one or more valve members configured to selectively block the path of exhaust gasses through the first and second bypass passages.

The baffle may extend in a generally axial direction with respect to a rotational axis of the turbine wheel.

The baffle may be an annular baffle. Where the baffle is annular, the baffle acts to encourage circulation of the exhaust gasses in the first and second outlet portions around the axis of the turbine wheel. As such, at the point immediately downstream of the baffle where the exhaust gasses in the first and second outlet portions are no longer separated by baffle, the exhaust gasses will be circulating around the axis of the turbine wheel in the same direction and at approximately the same speed. As such, detrimental flow effects such as turbulence at a distal end of the baffle are avoided, and the two streams of fluid are smoothly mixed.

The baffle may be arranged concentrically in relation to the turbine wheel and turbine housing. Where the baffle is concentric to the turbine wheel, the circulation of exhaust gasses around the axis of the turbine wheel may be symmetric.

The first bypass passage may be vented to a central region of the baffle, such that the central region of the baffle defines the first outlet portion. It will be appreciated that the term "vented" is intended to mean that the first bypass passage directs exhaust gasses from the first inlet portion and into the central region of the annular baffle.

The central region of the baffle may define a proximal end adjacent to the turbine wheel and a distal end opposite the proximal end and positioned further away from the turbine wheel, and wherein the central region of the baffle is open at both said distal end and said proximal end. As such, the central region may receive exhaust gasses from the turbine wheel and/or first bypass passage and transmit these exhaust gasses to the turbine outlet.

The first bypass passage may be vented to a position at or near the proximal end of the turbine wheel. That is to say, an exit of the first bypass passage may be positioned adjacent to an outlet of the turbine wheel. As such, exhaust gasses from the first bypass passage may enter the first outlet portion at an upstream part of the first outlet portion which is spaced apart from the distal end of the baffle.

The first bypass passage may be configured to direct exhaust gasses into the first outlet portion in a non-radial direction relative to an axis of rotation of the turbine wheel. That is to say, the exhaust gasses may enter the first outlet portion from the first bypass passage in a direction which is inclined relative to the radial direction of the axis of the turbine wheel in a plane which is normal to the axis of the turbine wheel. As such, circulation of the exhaust gasses around the axis of the turbine wheel is induced by the first bypass passage.

The second outlet portion comprises an annular region defined between the baffle and the turbine housing, and wherein the second bypass passage is vented to the annular region. It will be appreciated that the term "vented" is intended to mean that the second bypass passage directs exhaust gasses from the second inlet portion and into the annular region between the exterior of the baffle and the interior of the turbine housing. Furthermore, it will be appreciated the exterior of the baffle is defined by a radially outer surface of the baffle and the interior of the baffle is defined by a radially inner surface of the baffle.

Said annular region may have an upstream end and a downstream end spaced apart from the upstream end, and wherein the annular region is closed at the upstream end and open at the downstream end. That is to say, the annular region may define two ends, once of which is closed and the other of which is open. As such, exhaust gasses may be transmitted through the annular region to the turbine outlet.

The second bypass passage may be vented to the upstream end of the annular region. That is to say, an exit of the second bypass passage may be positioned such that it is spaced apart from the distal end of the baffle and towards the closed end of the annular region.

The second bypass passage may be vented to a position which is spaced apart from the upstream end of the annular region. It will be appreciated that by being spaced apart from the upstream (i.e. closed) end of the second outlet portion, the spacing may be tuned so as to reduce resonance of any pressure pulses present in the second outlet portion. As such, the exit of the second bypass passage is spaced apart from both the closed end of the second outlet portion and the distal end of the baffle. The second bypass passage may be vented to a position equidistant between the ends of the annular region, or may be vented to a position which is further towards one of the upstream or downstream ends of the annular region.

The second bypass passage may be configured to direct exhaust gasses into the second outlet portion in a non-radial direction relative to an axis of rotation of the turbine wheel. That is to say, the exhaust gasses may enter the second outlet portion (e.g. the annular region) from the second bypass passage in a direction which is inclined relative to the radial direction of the axis of the turbine wheel in a plane which is normal to the axis of the turbine wheel. As such, circulation of the exhaust gasses around the axis of the turbine wheel may be induced by the first bypass passage.

The baffle may be formed as an insert separable from the turbine housing. Alternatively, the baffle may be integrally formed with the turbine housing, such as for example by casting or welding. The first inlet portion may comprise a first volute and the second inlet portion may comprise a second volute separate to the first volute. The wastegate arrangement may comprise a first wastegate valve configured to open and close the first bypass passage and a second wastegate valve configured to open and close the second bypass passage. The first and second wastegate valves may be integrally formed with the turbine housing. The first and second wastegate valves may be external to the turbine housing. The turbine may form part of a turbocharger.

BRIEF DESCRIPTION OF THE DRAWINGS

Embodiments of the disclosure will now be described with reference to the accompanying drawings, in which.

DETAILED DESCRIPTION OF EMBODIMENTS OF THE DISCLOSURE

Figure 1:
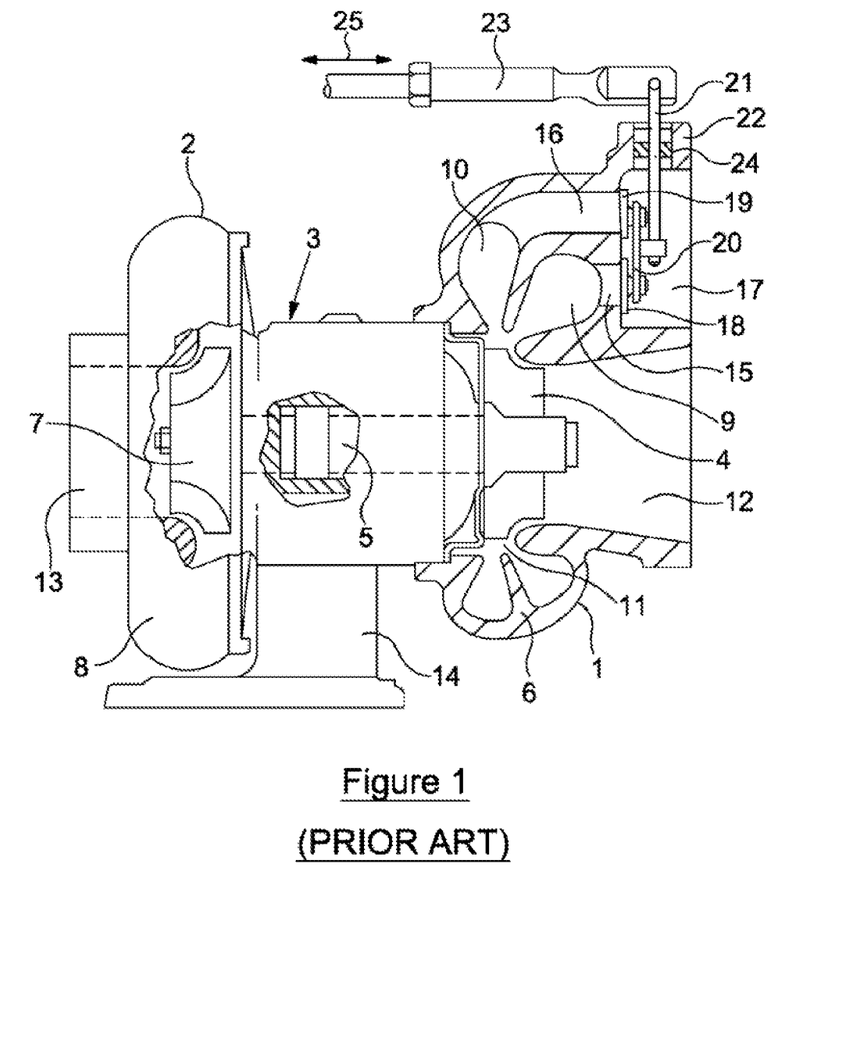
FIG. 1 shows a partial cross sectional view of a turbocharger comprising a turbine according to the prior art.

Referring to FIG. 1, this illustrates a turbocharger provided with a divided turbine inlet and twin wastegate valve assembly as disclosed in U.S. Pat. No. 5,046,317 referred to above. The illustrated turbocharger comprises a turbine 1 and a compressor 2 interconnected by a central bearing housing 3. The turbine 1 comprises a turbine wheel 4 mounted on one end of a shaft 5 within a turbine housing 6. The compressor 2 comprises a compressor wheel 7 mounted on the other end of the turbo shaft 5 within a compressor housing 8. The shaft 5 rotates about the turbocharger axis on bearing assemblies (not shown) located within the bearing housing 3.

The turbine housing comprises a divided inlet volute having parallel exhaust gas inlet paths 9 and 10 which deliver exhaust gas to the turbine wheel 4 via an annular inlet passage 11 and exits the turbine housing via an axial outlet passage 12.

The compressor housing 2 defines an axial inlet 13 and an outlet volute 14.

Exhaust gas flow through the turbine 1 causes rotation of the turbine wheel 4 which in turn rotates the compressor wheel 7 mounted to the opposite end of the shaft 5. As the compressor wheel 7 rotates, air is drawn in through the axial inlet 13, and delivered to the cylinders of an internal combustion engine (not shown) via outlet volute 14 at a boosted pressure above atmospheric pressure.

The turbine 1 is a wastegated turbine and as such each exhaust gas inlet path 9 and 10 is provided with a respective bypass passage 15 and 16 which communicate with a common outlet passage 17 via a dual wastegate valve assembly. The dual wastegate valve assembly comprises a pair of wastegate valve members, i.e. poppets 18 and 19 loosely mounted to opposite ends of a linking support member 20. Each poppet has a limited freedom of movement allowing the precise position of each poppet to shift slightly to accommodate small variations in the height of the respective valve seats defined around the opening of each bypass passage 15, 16.

The support member 20 is mounted to one end of the support arm 21 which extends through a wall 22 of the turbine housing and is connected at its opposite end to an actuator arm 23. A bushing 24 is provided in the turbine housing wall 22 to accommodate rotation of the support arm 21.

The end of the support arm 21 which is fixed to the support member 20 is bent at right angles to the axis of rotation of the support arm 21. The opposite end of the support arm 21 is linked to the actuator arm 23 so that reciprocal movement of the actuator arm (as indicated by arrow 25) causes rotation of the support arm 21 which in turn moves the linking support member 20 and the poppets 18, 19 to simultaneously open or close the bypass passages 15, 16. The tip of the support arm 21 is secured to the support member 20 so as to allow limited angular movement between the two. In particular, the pivotal connection between the tip of the support arm 21 and the support member 20 is intended to provide a centering action to improve accurate seating of the poppets.

The wastegate valve assembly is controlled to open as boost pressure produced by the compressor 2 reaches a predetermined level to permit a portion of exhaust gas flowing through the turbine inlet paths 9 and 10 to bypass the turbine wheel 4 and thus limit any further increase in boost pressure produced by the compressor. The outlet passage 17 may communicate to atmosphere (as suggested in U.S. Pat. No. 5,046,317) or may for instance communicate with the turbine outlet passage 12 so that the bypass gas flow merges with the main exhaust gas flow downstream of the turbine wheel 4.

Each of the exhaust gas inlet paths 9, 10 is fluidly connected to a separate bank of cylinders of the internal combustion engine via conduits or piping (not shown). As such, under normal operating conditions it is usual for a pressure pulse to be present in one of the inlet paths 9, 10 and not the other such that one inlet path is pressurised and the other is unpressurised. That is to say, the pressure in one of the inlet paths 9, 10 may be substantially greater than the pressure in the other inlet path for a short period of time, for example approximately 20 milliseconds.

It will be appreciated that when the bypass passages 15, 16 are opened (i.e. by actuation of the poppets 18, 19) the pressure pulses from the inlet paths 9, 10 are transmitted through the bypass passages 15, 16 to the outlet passage 17. This causes the pressure of the exhaust gas in the region of the outlet passage 17 immediately downstream of the unpressurised one of the bypass passages 15, 16 to be higher than the pressure of the exhaust gas within the unpressurised one of the bypass passages 15, 16. This localised pressure increase results in a corresponding drop in velocity of the exhaust gasses and therefore acts to choke the flow out of the unpressurised one of the bypass passages 15, 16. The ability of the wastegate to discharge exhaust gasses from the turbine 1 is therefore impeded by slowing of the exhaust gasses in the outlet passage 17 as a result of interference between the two streams of exhaust gasses. That is to say, cross-communication between the exhaust gasses leaving the bypass passages 15, 16 within the outlet passage 17 reduces the rate at which exhaust gasses can be transmitted through the wastegate.

Figure 2:
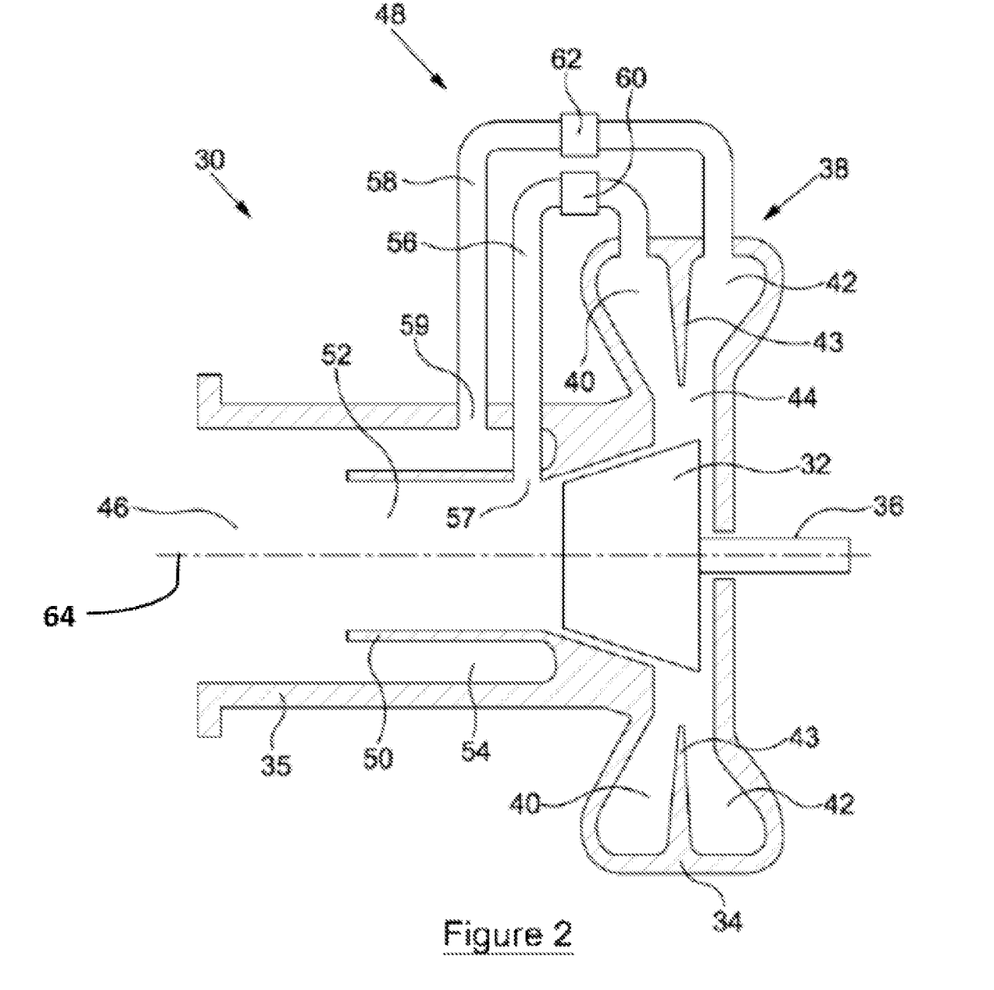
FIG. 2 shows a schematic cross sectional side view of a turbine according to the present disclosure.

FIG. 2 shows a schematic cross sectional view of a turbine 30 according to the present disclosure. The turbine 30 may be used within a turbocharger such as that exemplified in FIG. 1 above with reference to U.S. Pat. No. 5,046,317, or may be used in any suitable application as would be apparent to the skilled person (e.g. within a power turbine or otherwise). The turbine 30 comprises a turbine wheel 32 contained within a turbine housing 34. The turbine wheel 32 is fixedly connected to a turbine shaft 36 which is supported for rotation by a bearing housing (not shown). The turbine housing 34 defines an inlet volute 38 divided into a first inlet path 40 and a second inlet path 42. The first and second inlet paths are fluidly connected to two separate banks of cylinders of an internal combustion engine (not shown) by piping. The first and second inlet paths 40, 42 deliver exhaust gasses from an internal combustion engine to the turbine wheel 32 via an annular inlet passage 44. Mixing between the first and second inlet paths 40, 42 is substantially prevented by the presence of a divider wall 43 within the inlet volute 38.

The turbine 30 comprises a turbine outlet 46 defined by a tubular portion 35 of the turbine housing 34 and having a baffle 50 positioned therein. The baffle 50 is generally tubular in shape and comprises a generally annular cross section. The baffle 50 comprises a distal end 51 which is defined as the most downstream point of the baffle 50 relative to the flow of fluid through the turbine outlet 46. The baffle 50 divides the turbine outlet 46 into an inner outlet portion 52 and an outer outlet portion 54. The inner outlet portion 52 is defined as the cylindrical region bounded by the baffle 50, whilst the outer outlet portion 54 is defined as the annular region bounded between the tubular portion 35 of the turbine housing 34 and the baffle 50. The inner outlet portion 52 is open at an upstream end to receive exhaust gasses from the turbine wheel 32 and is open at a downstream end to transmit fluid to the turbine outlet 46. The outer outlet portion 54 is closed at an upstream end by the turbine housing 34 and is open at a downstream end to transmit fluid to the turbine outlet 46.

The turbine 30 comprises a wastegate arrangement 48 which connects the first and second inlet paths 40, 42 to the turbine outlet 46 by bypassing the turbine wheel 32. The wastegate arrangement 48 comprises a first bypass passage 56 which connects the first inlet path 40 to the inner outlet portion 52. The first bypass passage 56 comprises an exit 57 which is defined by the baffle 50 as an aperture of the baffle 50. The first bypass passage 56 comprises a conduit which extends through part of the outer outlet portion 54 to the exit 57. The wastegate arrangement 48 further comprises a second bypass passage 58 which connects the second inlet path 42 to the outer outlet portion 54. The second bypass passage 58 comprises an exit 59 which is defined by the turbine housing 34 as an aperture of the tubular portion 35.

The exit 57 of the first bypass passage 56 is positioned at an upstream end of the baffle 50 such that it is slightly downstream from the turbine wheel 32. That is to say, the exit 57 of the first bypass passage 56 is immediately adjacent to an outlet of the turbine wheel 32, such that it is spaced away from the distal end 51 of the baffle 50 in an axial direction relative to an axis of rotation 64 of the turbine wheel 32. The exit 59 of the second bypass passage 58 is positioned at an upstream end of the outer outlet portion 54. That is to say, the exit 59 of the second bypass passage 56 is also spaced away from the distal end 51 of the baffle 50 in the axial direction and towards the turbine wheel 32.

The first bypass passage 56 comprises a first wastegate valve 60 disposed between the first inlet path 40 and the exit 57 of the first bypass passage 56. Likewise, the second bypass passage 58 comprises a second wastegate valve 62 disposed between the second inlet path 42 and the exit 59 of the second bypass passage 58.

The first and second wastegate valves 60, 62 are each configurable between an open state in which exhaust gasses are permitted to vent through the respective one of the first and second bypass passages 56, 58 to the turbine outlet 46 whilst bypassing the turbine wheel 32 and a closed state in which such venting is substantially prevented. It will be appreciated that the first and second wastegate valves 60, 62 may be any suitable wastegate valve, for example a poppet valve. Furthermore, the first and second wastegate valves 60, 62 may be either integral with or external to the turbine housing 34. That is to say, the first and second wastegate valves 62, 60 may be at least partially defined by the turbine housing 34 (such as that shown with respect to the prior art in FIG. 1) or may be entirely separate to the turbine housing 34. Where the first and second wastegate valves 60, 62 are external to the turbine housing 34, the first and second wastegate valves 60, 62 may be connected between the inlet volute 38 and the turbine outlet 46 by conduits or piping which at least partially define the first and second bypass passages 56, 58.

During use, exhaust gasses from the internal combustion engine are passed from the first and second inlet paths 40, 42 through the annular inlet 44 and are directed onto turbine wheel 32. The kinetic energy of the exhaust gasses causes the turbine wheel 32 to rotate and thereby extract useful work from the exhaust gasses. As explained above with reference to the prior art, where the turbine 30 is part of a turbocharger this rotation is used to drive a compressor wheel which acts to compress intake air to a boost pressure substantially above atmospheric pressure.

Where rotation of the turbine wheel is required to be slowed, such as for example to avoid detrimental operating conditions such as compressor surge, the first and second wastegate valves 60, 62 are opened. Opening of the first and second wastegate valves 60, 62 permits some or all of the exhaust gasses in the first and second inlet passages 40, 42 to bypass the turbine wheel 32 and vent directly to the turbine outlet 46. As such, the kinetic energy imparted on the turbine wheel 32 by the exhaust gasses is reduced and the rotational velocity of the turbine wheel slowed accordingly.

It will be appreciated that because the first and second inlet paths 40, 42 are connected to separate banks of cylinders of the internal combustion engine, under normal operating conditions it is usual for a pressure pulse to be present within the one of the inlet paths 40, 42 and not the other. For example, if a cylinder which is fluidly connected to the first inlet path 40 has just fired and the cylinders which are fluidly connected to the second inlet path 42 are between firing intervals, a relatively high pressure will be present within the first inlet path 40 whilst a relatively low pressure will be present in the second inlet path 42 (i.e. lower than the pressure in the first inlet path 40). When the first wastegate valve 60 is opened, the pressure within the first inlet path 40 is transferred to the inner outlet portion 52 via the first bypass passage 56. Likewise, when the second wastegate valve 62 is opened, the pressure within the second inlet path 42 is transferred to the outer outlet portion 54 via the second bypass passage 58.

Pressure pulses from the first inlet path 40 and second inlet path 42 are introduced into the turbine outlet 46 at the exits 57, 59 of the first bypass passage 56 and the second bypass passage 58 respectively. It will be appreciated that because the baffle 50 separates the inner outlet portion 52 and the outer outlet portion 54, interference between any pressure pulses emanating from the exits 57, 59 of the bypass passages may only occur downstream of the baffle 50. That is to say, the pressure pulses from either the first or second bypass passages 56, 58 must travel around the distal end 51 of the baffle 50 relative to the turbine wheel 32 before encountering a corresponding pressure pulse from the other of the first or second bypass passages 56, 58. Any resulting pressure increases will therefore be local to the distal end 51 of the baffle 50. It follows that flow through the region surrounding the distal end 51 of the baffle 50 will be slowed due to the increased pressure of the exhaust gasses in this region. However, because the restriction to flow occurs at a location of the turbine outlet 46 which is spaced apart (i.e. away) from the exits 57, 59 of the first and second bypass passages 56, 58 the impact of this restriction to flow is substantially reduced. In other words, the baffle 50 moves the restriction to flow away from the exits 57, 59 of the first and second bypass passages 60, 62 and therefore flow out of the exits 57, 59 is less restricted than the situation where the exits 57, 59 are not separated by a baffle.

The exit 59 of the second bypass passage 58 is spaced from the closed end of the outer outlet portion 54. As such, a pressure pulse transmitted out of the exit 59 of the second bypass passage 58 may be reflected from the closed end of the outer outlet portion 54. It will be appreciated that the spacing between the exit 59 of the second bypass passage 58 may be selected such that the reflected pressure pulse is tuned to the typical operating frequencies of the internal combustion engine. The spacing may therefore act to prevent resonance of the pressure pulses of the exhaust gasses in the outer outlet portion 54, and hence further reduce any impedance to flow through the wastegate arrangement 48.

Figure 3:
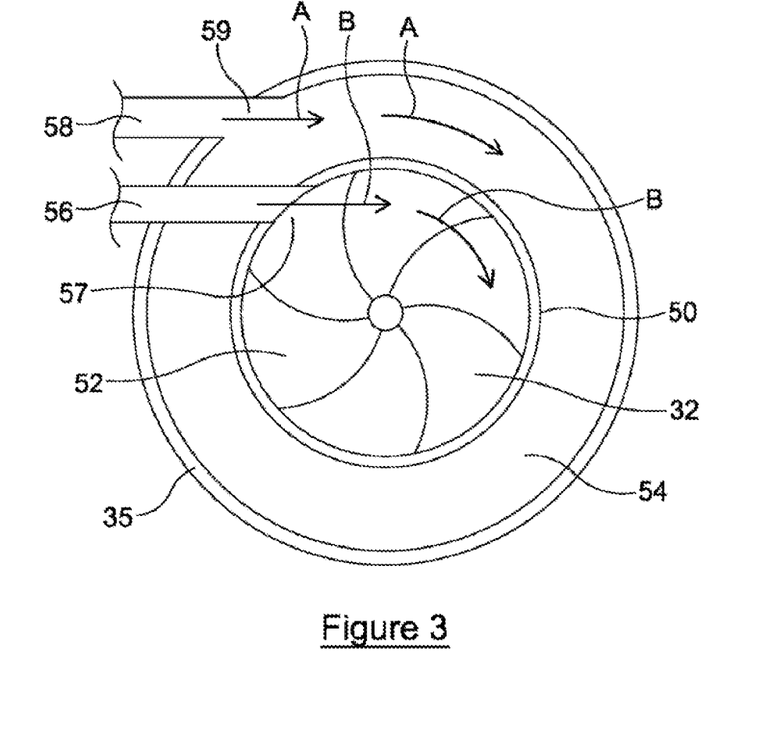
FIG. 3 shows a schematic cross sectional end view of the turbine of FIG. 2.

FIG. 3 shows a cross sectional end view of the turbine 30 of FIG. 2. The first bypass passage 56 is angled relative to the baffle 50 such that it is non-normal to an inner surface of the baffle 50. Likewise the second bypass passage 58 is angled relative to the tubular portion 35 of the turbine housing 34 such that it is non-normal to an inner surface of the tubular portion 35. Because the first and second bypass passages are angled relative to the baffle 50 and the tubular portion 35 of the turbine housing 34 swirling of the exhaust gasses about the axis of rotation 64 (see FIG. 2) of the turbine wheel 32 is induced as the exhaust gasses enter the inner and outer outlet portions 52, 54. That is to say, because the exhaust gasses from the first and second bypass passages 56, 58 are directed into the inner outlet portion 52 and outer outlet portion 54 in a non-radial direction with respect to the axis 64 of the turbine wheel this encourages the exhaust gasses to circulate around the axis 64 of the turbine wheel 32, as shown by the arrows A and B.

During normal use when the wastegate valves 60, 62 are closed, the exhaust gasses present in the inner outlet portion 52 circulate around the axis 64 of the turbine wheel 32 due to the rotation of the turbine wheel 32. As such, by inducing swirling of the exhaust gasses entering the inner outlet portion 52 the exhaust gasses transmitted via the wastegate arrangement 48 are able to smoothly join the flow of any exhaust gasses leaving the outlet of the turbine wheel 32. Furthermore, turbulence at the distal end 51 of the baffle 50 is also avoided because both streams of fluid are circulating in the same direction and at similar speeds. That is to say, by inducing swirling in both the inner and outer outlet portions 52, 54, when the two circulating streams of exhaust gasses join one another they move in unison and therefore disturbances to the flow in the turbine outlet 46 are avoided. In this manner, a smooth mixing of exhaust gasses from the inner and outer outlet portions 52, 54 downstream of the baffle 50 is achieved.

In order to induce swirl within the inner outlet portion 52, the first bypass passage 56 is inclined at an angle relative to the circumference of the baffle 50 at the point where the bypass passage 56 intersects the baffle 50. The angle of the first bypass passage 56 relative to the circumference of the baffle 50 may vary substantially anywhere in the range of 0° (such that is tangential to the circumference of the baffle 50) to 45°. Likewise, in order to induce swirl within the outer outlet portion 54, the second bypass passage 58 is inclined at an angle relative to the circumference of the tubular portion 35 of the turbine housing 34. The angle of the second bypass passage 58 relative to the circumference of the tubular portion 35 may also vary substantially anywhere in the range of 0° to 45°. It will be understood that the precise angles of the first and/or second bypass passages 56, 58 are not critical, provided that the angles are sufficient to induce swirling of the exhaust gasses within the inner and outer outlet portions 52, 54. It will be appreciated that the first and second bypass passages 56, 58 may be inclined at the same or different angles.

Furthermore, in order to induce flow of the exhaust gasses in an axial direction relative to the axis 64 of the turbine wheel 32, in alternative embodiments of the disclosure the first and/or second bypass passages 56, 58 may also be inclined at a non-normal angle relative to the axis 64 of the turbine wheel 32. That is to say, the first and/or second bypass passages may be arranged such that they point towards the turbine outlet 46. In an example embodiment, the angle of the first and/or second bypass passage relative to the axis 64 may be varied substantially anywhere within the range of 45° to 90°. It will be appreciated that by being inclined at a non-normal angle relative to the axis 64 of the turbine wheel 32, exhaust gasses in the inner and outer outlet portions 52, 54 are encouraged to travel away from the turbine wheel 32, so as to result in a helical or spiral-like flow path. As such, the exhaust gasses transmitted through the wastegate 38 are carried with the flow of the exhaust gasses which have passed through the turbine wheel 32 and hence turbulence in the regions where the bypass passages 56, 58 connect to the inner and outer outlet portion 52, 54 is avoided.

It will be appreciated that in alternative embodiments of the disclosure the baffle 50 could be substantially any cross sectional shape. For example, the baffle may be rectangular in cross section. Additionally or alternatively, the baffle 50 may be tapered along its length. For example, the baffle 50 may be configured to define a wider cross section at the distal end 51 of the baffle 50 relative to the turbine wheel 32 such that the baffle 50 acts to diffuse exhaust gasses in the inner outlet portion 52. In such embodiments, the outer outlet portion 54 may be correspondingly tapered.

Furthermore, in alternative embodiments of the disclosure the outer outlet portion 54 may not surround the inner outlet portion 52 in an annular manner. For example, the baffle 50 may define a conduit of the turbine outlet 46 which runs parallel to the axis 64 of the turbine wheel 32. In particular, the baffle 50 may define a chord dividing the tubular portion 35 of the turbine housing 34 into two separate outlet portions. Alternatively, the baffle 50 may extend into the tubular portion 35 of the turbine housing 34 in the manner of a pitot tube (although oriented away from the direction flow out of the turbine wheel 32). It will be appreciated that exhaust gasses in either of the outlet portions are prohibited from mixing until they are downstream of the distal end 51 of the baffle 50.

It will be appreciated that the length of the baffle 50 comprises a length parallel to the axis 64 of the turbine wheel 32 which may be substantially any suitable length, provided that the baffle 50 acts to divide the turbine outlet 46 to prevent mixing between the inner and outer outlet portions 52, 54. That is to say, the baffle 50 may be any length as would be apparent to the skilled person, and may, in particular, be dependent upon one or more of: a diameter of the tubular portion 35 of the turbine housing 34, a diameter of the turbine wheel 32, a length of the tubular portion 35 of the turbine housing 34 in a direction parallel to the axis 64 of the turbine wheel 32, an axial length of the turbine wheel 32 parallel to the axis 64 of the turbine wheel 32, the velocity, pressure, temperature or density of the exhaust gasses through the turbine outlet 46, or any other characteristic of the construction of the turbine 30 or its operating conditions. Likewise, the baffle 50 defines a thickness in a radial direction relative to the axis 64 of the turbine wheel 32 which may be substantially any suitable thickness as would be apparent to the skilled person and/or based upon any one or more of the parameters listed above. For example, the thickness of the baffle 50 in the radial direction may be approximately 2 to 5 mm.

In the embodiment shown, the first bypass passage 56 comprises a conduit which extends through part of the outer outlet portion 54. However, it will be appreciated that in alternative embodiments of the disclosure the base of the outer outlet portion 54 and the first bypass passage 56 may be arranged such that the first bypass passage 56 is wholly or partially upstream of the base of the outer outlet portion 54.

It will be appreciated that in alternative embodiments of the disclosure, the exits 57, 59 of the first and second bypass passages 40, 42 may be located at any suitable position within the inner outlet portion 52 and outer outlet portion 54 respectively. For example, the exit 59 of the second bypass passage 58 may be positioned at the same point along the axis 64 as the exit 57 of the first bypass passage 56, or may even be positioned upstream of the exit 57 of the first bypass passage 56. That is to say, the precise position of the exits 57, 59 is may be varied provided that the baffle 50 acts to provide a tortuous path for any gas flow communication between the exits 57, 59. Furthermore, any axial spacing between the exits 57, 59 such as that shown in FIG. 2 may be selected so as to promote improved joining of flow at the distal end 51 of the baffle 50. In particular, such axial spacing between the exits may be selected in dependence upon the operating parameters of the engine, such as the incoming magnitude and/or frequency of the incoming pressure pulses.

It will further be appreciated that the exits 57, 59 of the first and second bypass passages 56, 58 may intersect the baffle 50 and tubular portion 35 respectively at substantially any angular position with respect to the axis 64. That is to say, the exits 57, 59 may be positioned on the same side as one another relative to the axis 64 (such as that shown in FIG. 3), on opposite sides of the axis 64 or at any arbitrary position around the axis 64.

It will be appreciated that the first and second wastegate valves may be operated independently from one another, or may be configured to actuate simultaneously.

What is claimed is:

1. A turbine comprising:
    a turbine housing;
    a turbine wheel;
    an inlet upstream of the turbine wheel, the inlet defining a first inlet volute and a second inlet volute separate from the first inlet volute, the first inlet volute and the second inlet volute being configured to deliver exhaust gasses from an internal combustion engine to the turbine wheel;
    an outlet downstream of the turbine wheel, the outlet defining a first outlet portion and a second outlet portion; and
    a wastegate arrangement including at least one valve, the wastegate arrangement configured to selectively vent exhaust gas from the first inlet volute to the first outlet portion via a first bypass passage, and further configured to selectively vent exhaust gas from the second inlet volute to the second outlet portion via a second bypass passage separate from the first bypass passage;
    wherein the first outlet portion and the second outlet portion are separated by an annular baffle of the turbine housing;
    wherein the first bypass passage is vented to a central region of the baffle, such that the central region of the annular baffle defines the first outlet portion; and
    wherein the second outlet portion comprises an annular region defined between the annular baffle and the turbine housing, and wherein the second bypass passage is vented to the annular region.

2. The turbine according to claim 1, wherein the baffle extends in a generally axial direction with respect to a rotational axis of the turbine wheel.

3. The turbine according to claim 1, wherein the baffle is arranged concentrically in relation to the turbine wheel and the turbine housing.

4. The turbine according to claim 1, wherein the central region of the baffle defines a proximal end adjacent to the turbine wheel and a distal end opposite the proximal end and positioned further away from the turbine wheel, and wherein the central region of the baffle is open at both said distal end and said proximal end.

5. The turbine according to claim 4, wherein the first bypass passage is vented to a position at or near the proximal end adjacent to the turbine wheel.

6. The turbine according to claim 4, wherein the first bypass passage is configured to direct exhaust gasses into the first outlet portion in a non-radial direction relative to an axis of rotation of the turbine wheel.

7. The turbine according to claim 1, wherein said annular region has an upstream end and a downstream end spaced apart from the upstream end, and wherein the annular region is closed at the upstream end and open at the downstream end.

8. The turbine according to claim 7, wherein the second bypass passage is vented to the upstream end of the annular region.

9. The turbine according to claim 8, wherein the second bypass passage is vented to a position which is spaced apart from the upstream end of the annular region.

10. The turbine according to claim 1, wherein the second bypass passage is configured to direct exhaust gasses into the second outlet portion in a non-radial direction relative to an axis of rotation of the turbine wheel.

11. The turbine according to claim 1, wherein the baffle is formed as an insert separable from the turbine housing.

12. The turbine according to claim 1, wherein the baffle is integrally formed with the turbine housing.

13. The turbine according to claim 1, wherein the wastegate arrangement comprises a first wastegate valve configured to open and close the first bypass passage and a second wastegate valve configured to open and close the second bypass passage.

14. The turbine according to claim 13, wherein the first wastegate valve and the second wastegate valves are integrally formed with the turbine housing.

15. The turbine according to claim 13, wherein the first wastegate valve and the second wastegate valves are external to the turbine housing.

16. The turbine according to claim 1, wherein the turbine forms part of a turbocharger.

* * * * *